(12) United States Patent
Naka et al.

(10) Patent No.: US 6,787,171 B2
(45) Date of Patent: Sep. 7, 2004

(54) METHOD FOR PRE-PROCESSING OF DRIED FOOD

(76) Inventors: Kazuo Naka, 5-1587-1 Mitsugashima, Tokorozawa, Saitama (JP), 359-1164; Shigeru Matsuda, 13-1 Jyofu, Yao-cho, Nei-gun, Toyama (JP), 993-2314

( * ) Notice: Subject to any disclaimer, the term of this patent is extended or adjusted under 35 U.S.C. 154(b) by 0 days.

(21) Appl. No.: 10/426,390

(22) Filed: Apr. 28, 2003

(65) Prior Publication Data

US 2003/0203085 A1 Oct. 30, 2003

Related U.S. Application Data

(62) Division of application No. 09/904,821, filed on Jul. 12, 2001, now Pat. No. 6,602,531.

(51) Int. Cl.⁷ .............................. A23L 1/232; A23L 3/32
(52) U.S. Cl. ....................... 426/244; 426/424; 426/540; 426/650
(58) Field of Search ................................ 426/244, 314, 426/315, 319, 424, 540, 650, 652

(56) References Cited

U.S. PATENT DOCUMENTS

| | | |
|---|---|---|
| 3,988,484 A | 10/1976 | Shatila |
| 4,810,519 A | 3/1989 | Myers et al. |
| 4,876,108 A * | 10/1989 | Underwood et al. ........ 426/650 |
| 4,902,528 A | 2/1990 | Groesbeck et al. |
| 5,002,788 A | 3/1991 | Satake |
| 5,017,395 A | 5/1991 | McCaskill et al. |
| 5,135,770 A | 8/1992 | Underwood |
| 5,136,791 A | 8/1992 | Fraile et al. |
| 5,275,836 A | 1/1994 | Lewis et al. |
| 5,316,783 A | 5/1994 | Kratochvil et al. |
| 5,427,810 A | 6/1995 | Vorwerck et al. |
| 5,980,962 A | 11/1999 | Bracken et al. |
| 6,139,898 A | 10/2000 | Meyer et al. |
| 6,152,024 A | 11/2000 | Tippmann |
| 6,214,395 B1 | 4/2001 | Moeller et al. |
| 6,261,623 B1 * | 7/2001 | Moeller ..................... 426/540 |

FOREIGN PATENT DOCUMENTS

| | | |
|---|---|---|
| JP | 753320 | 2/1995 |
| JP | P3096972 | 1/1999 |

* cited by examiner

*Primary Examiner*—George C Yeung
(74) *Attorney, Agent, or Firm*—Mark D. Miller

(57) ABSTRACT

Disclosed are methods for making a unique activated smoke liquid solution for application to food that is to be dried. Treatment of food with this solution greatly improves the processing, cooking and/or physical characteristics of the dried food when it is later reconstituted and used. The unique activated smoke liquid solution is made from a special process which gives it the desired characteristics which, when properly applied before drying, result in improved quality of dried food when later reconstituted. By applying the unique smoke liquid solution according to the present invention, no soaking or immersion of the dried food products in water or liquid is necessary prior to processing or cooking. The resulting dried food immediately absorbs water for prompt processing or cooking; it has increased weight and volume; it has a prolonged shelf life; and it retains much of its original food texture after it is freeze-thawed. Thus, the present invention provides methods for manufacturing non-soak, high quality dried food products.

8 Claims, 2 Drawing Sheets

METHOD FOR PRE-PROCESSING OF DRIED FOOD

This application is a division of application Ser. No. 09/904,821, filed Jul. 12, 2001, now U.S. Pat. No. 6,602,531.

BACKGROUND OF THE INVENTION

1. Field of Invention.

The present invention relates to a method and apparatus for pre-processing of food to be dried, and more particularly to an improved manufacturing process and related equipment used to improve the characteristics of grains, dried fruit, dried vegetables and the like. Such processed dried food has significantly superior characteristics when reconstituted, processed or cooked.

2. Description of the Prior Art.

Conventional dried food products are made by evaporation of moisture or water by heat under atmospheric or mechanically reduced pressure, exposure to sun and wind, or freeze-drying. Such drying may be accomplished with or without pre-treatment with heat or heat/brine or chemicals. Foods dried in this way require comparatively long periods of immersion or soaking in water or liquid for reconstitution before they may be processed or cooked. Such conventional methods do not ordinarily take into consideration the processing, cooking or physical characteristics of the particular dried food product such as water absorption capability, water holding or retention capacity, weight and volume after processed or cooked, shelf life, quality, or food texture after freeze-thawed, not to mention the characteristics of products which are prepared with dried food products as their ingredients.

In order to address these problems, certain pre-processing, milling and soaking methods and apparatus have been developed to remove the outer skin layers of foods prior to drying (e.g. removal of bran adhered to white rice). However, pre-soaking foods to remove outer skin layers prior to drying can significantly diminish the flavor, quality and texture of the food. Existing milling methods and apparatus do not necessarily remove all of the outer skin layer from foods. This problem is particularly severe for foods having irregular shapes such as mushrooms.

It is therefore desirable to provide a method and apparatus for pre- or post-processing of dried food products such as wheat, rice, barley, other grains, soybeans, legumes, dried vegetables, dried mushrooms, dried fruits, dried sea/aqua products and other dried food products in order to give the food improved characteristics upon reconstitution, including (a) rapid water absorption without pre-soaking or immersion in water or liquid prior to or after drying in order to improve the processing, cooking and/or physical characteristics of the dried foods, (b) rapid water absorption, (c) increased water holding capacity, (d) increase in weight and volume after being processed or cooked, (e) extension of shelf life and quality, and (f) retention of original food texture after freeze-thawed.

Japanese patent No. P3096972 discloses a manufacturing process and equipment for polishing white rice without wash that utilizes an activated smoke liquid solution in a pressure spray apparatus.

SUMMARY OF THE INVENTION

The present invention provides a method and apparatus for processing dried food products before or after they are dried in order to provide such dried food products with preferred reconstitution characteristics such as rapid water absorption without pre-soaking or immersion in water or liquid. The method and apparatus improves the processing, cooking and/or physical characteristics of the dried foods, or foods prepared with dried foods as ingredients, when reconstituted including rapid water absorption, increased water holding capacity, an increase in weight and volume after processing or cooking, extension of shelf life and quality, and retention of original food texture after freeze-thawed.

The above characteristics are accomplished through the use of an improved activated smoke liquid solution that is diluted in deep-sea water and used in a special process for non-soak application to the food to be dried. The activated smoke liquid solution is applied to the food in one of several different alternative methods in order to assure complete coverage. The liquid smoke solution moistens the outer layer of the food thereby enhancing the characteristics of the food itself.

It is therefore a primary object of the present invention to provide a method and apparatus for pre-processing dried foods that improves the processing, cooking and/or physical characteristics of the dried foods, or foods prepared with dried foods as ingredients, when reconstituted.

It is also an important object of the present invention to provide a method and apparatus for processing dried food that utilizes an improved activated smoke liquid solution diluted in deep sea water.

It is also an important object of the present invention to provide a method and apparatus for processing dried food that utilizes an improved activated smoke liquid solution that is pressurized by inert gas and sprayed over the food products to be treated providing a highly inert environment.

It is also an object of the present invention to provide a method and apparatus for processing dried food that results in dried food that is able to immediately absorb water upon re-hydration.

It is also an object of the present invention to provide a method and apparatus for processing dried food that results in dried food that is able to retain water and food texture when the dried food products are reconstituted.

It is also an object of the present invention to provide a method and apparatus for processing dried food that results in dried food that may be immediately processed or cooked without a prior soaking or immersing process.

It is also an object of the present invention to provide a method and apparatus for processing dried food that results in dried food that has increased shelf life in terms of quality and stability.

It is also an object of the present invention to provide a method and apparatus for processing dried food that prevents food texture deterioration after freeze-thawing by retaining the water holding capability of the food.

It is also an object of the present invention to provide a method and apparatus for processing dried food products that reduces water, energy, labor and the cost associated with later processing or cooking such dried food products.

It is also an object of the present invention to provide a method and apparatus for processing dried food products that reduces the volume and solids content of waste water associated with processing or cooking such dried food products.

It is also an object of the present invention to provide a method and apparatus for processing dried food that results in dried food that does not require food additives or other food ingredients which are often used to improve the physical characteristics of such food products when they are later processed or cooked.

Other objects of the invention will be apparent from the detailed descriptions and the claims herein.

DETAILED DESCRIPTION OF THE PREFERRED EMBODIMENTS

Figure 2:
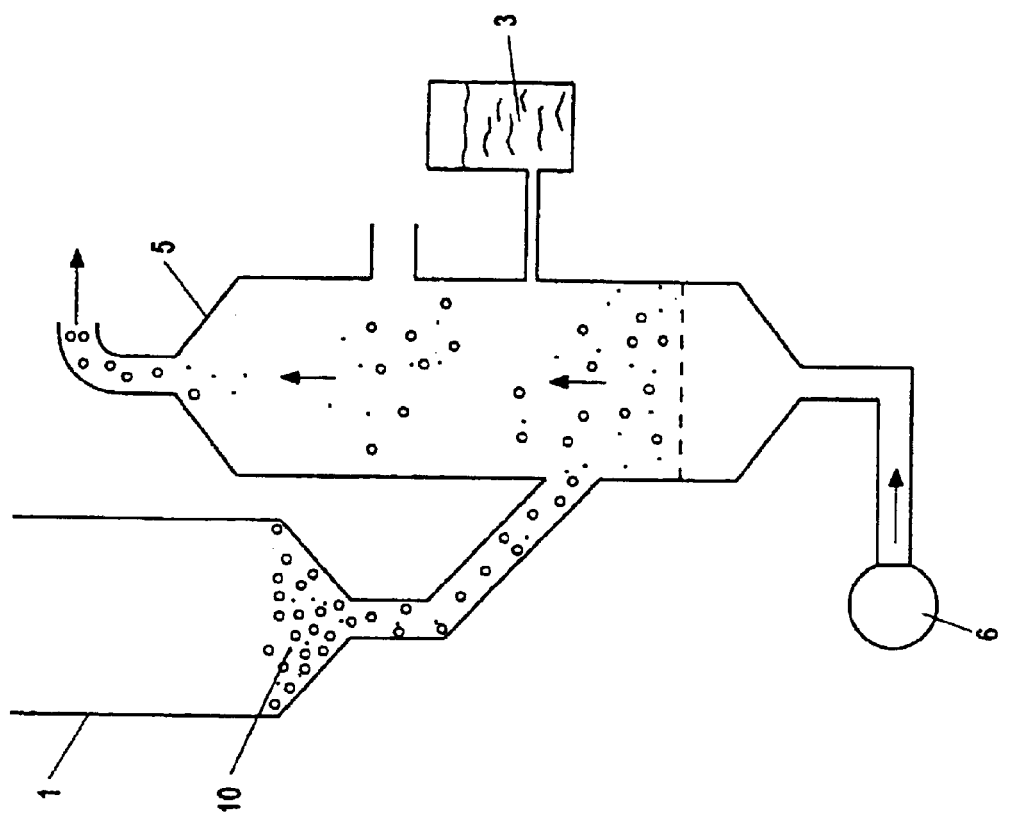
FIG. 2 is a diagrammatic side view of another embodiment of the present invention.
Figure 1:
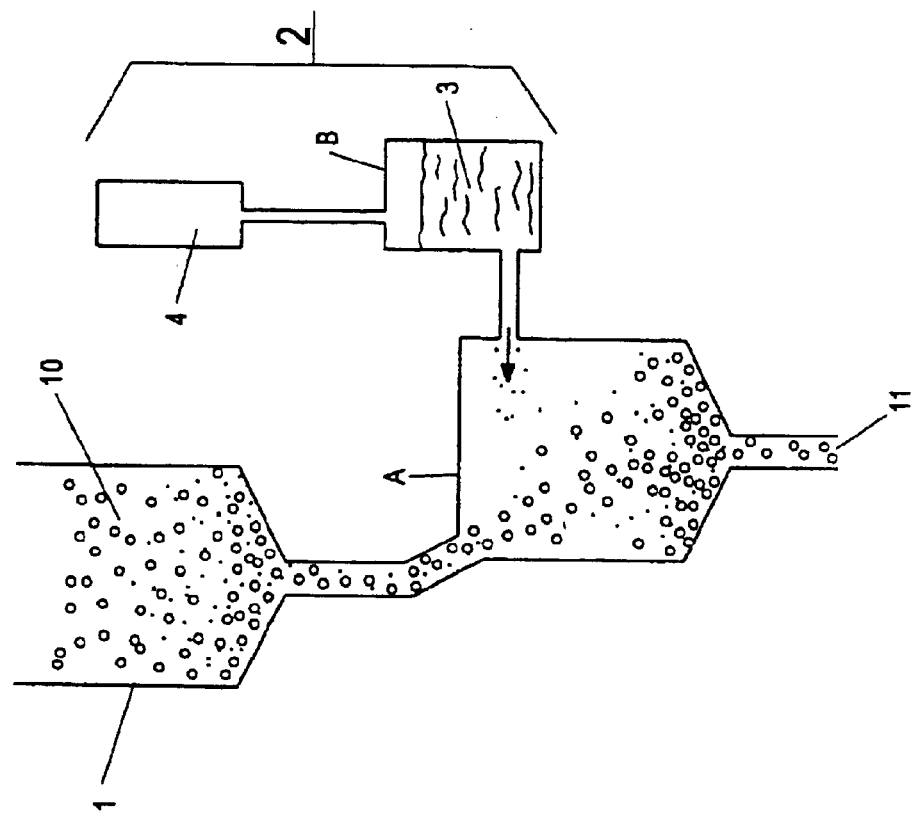
FIG. 1 is a diagrammatic side view of a first embodiment of the present invention.
Figure 5:
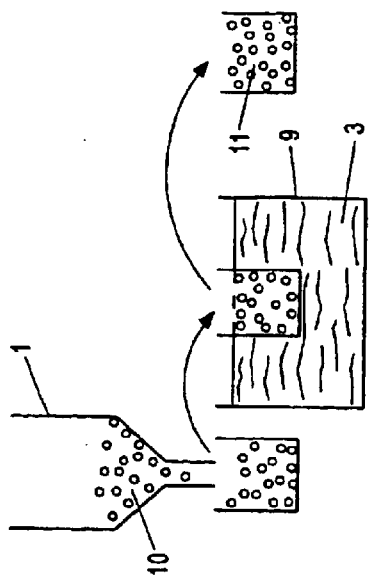
FIG. 5 is a diagrammatic side view of another embodiment of the present invention.

Referring to the drawings wherein like reference characters designate like or corresponding parts throughout the several views, the following reference characters have the following meanings:

1. Food tank or storage bin;
2. Activated smoke liquid solution spraying equipment;
3. Activated smoke liquid;
4. Inert gas such as nitrogen, carbon dioxide, a mixture of nitrogen and carbon dioxide, or other;
5. Fluidized bed equipment;
6. Pressurized air;
7. Pneumatic transport;
8. Belt conveyor;
9. Activated smoke liquid solution immersion tank;
10. Untreated food; and
11. Treated food.

The improved activated smoke liquid solution to be used in the present invention is prepared by first pyrolizing raw material woods or bamboo under deoxidized conditions, and then passing the smoke fraction generated therefrom at a temperature between 80 and 350 degrees Celsius (C) through a water cooling heat exchanger. Below 80° C., there is a higher possibility of collecting methanol and/or low molecular weight aldehydes, which do not provide the desired characteristics. Above 350° C., there is a higher possibility of collecting undesirable benzopyrene and/or potentially hazardous materials.

A crude smoke liquid concentrate is prepared by liquefying the smoke fraction through cooling/condensing and by activation treatment in an electrified field. This is accomplished by electrifying the crude liquid concentrate with electrodes where high voltage direct current (50–60 Hz; 1,000–10,000 Volts) is applied. The crude smoke liquid is then allowed to stand for 1–6 months, depending upon the raw materials used, until it separates into three distinct layers of oil, smoke liquid and tar. Thereafter, the floated oil fraction and heavy precipitated fraction (tar) are removed, and the remaining portion of the crude smoke liquid concentrate is distilled and then cooled/condensed at a temperature of between 80 to 160 degrees C. Finally, the distilled fraction is diluted with deep sea water to result in a solution having a range of between 100 ppm and 3,000 ppm of the active ingredient. The deep sea water should be taken from a depth of approximately than 300 meters (984 ft.) or more. Sea water taken from this depth (where solar rays do not reach) has a very high mineral content, high hardness, is slightly alkaline (pH 7.5 to 7.8), is clear and relatively unpolluted, and has compacted and stable water molecule clusters. These characteristics improve the stability and functionality of the diluted smoke liquid solution for use in the present invention including increasing its effectiveness on the food in terms of water absorption, water holding capacity, extension of shelf life of cooked food (such as rice) and improved food texture after freeze-thawing.

For illustrative purposes and by way of example only, and without limiting the scope of the appended claims herein, some examples of useful dilutions include approximately 1,200 ppm for fruits, approximately 240 ppm for vegetables and approximately 2,000 ppm for rice. Of course, these dilutions may vary widely depending upon the particular fruit, vegetable, grain or other food product under consideration, as well as the shape, size, type, variety, and other characteristics of the particular food product.

Embodiments of the manufacturing process and equipment of the present invention are illustrated in FIGS. 1–5. The food 10 to be processed may already be dried, or may not yet be dried. Food 10 is a product such as rice, barley, wheat, other grains, soybean/legumes, dried vegetables, dried mushrooms, dried fruits, dried sea/aqua products, and the like. In the preferred embodiment of FIG. 1, food 10 to be processed is dropped from a storage tank or bin 1 by gravity through a chamber A where the activated smoke liquid solution 3 is sprayed onto the food 10. The spraying equipment 2 utilizes an inert gas 4 such as nitrogen, carbon dioxide, a mixture of the two, or the like. Gas 4 is mixed with smoke liquid solution 3 in chamber B (said solution already having been diluted with deep sea water in a range of between approximately 100 and 3,000 ppm liquid smoke solution depending on the food product to be processed), and then sprayed under pressure onto the untreated food 10 dropping through chamber A. This treatment moistens the outer layers of the food 10. The smoke liquid solution adheres to the skin (e.g. the outer germ and starchy layer of rice). Most treated food products 11 absorbs a part of the inert gas. The inert gas is oxygen-free thereby preventing oxidation of food components and increasing stability and extending the shelf life of the finished product which improves the effectiveness of activated smoke liquid and prolongs the shelf life of dried products and processed or cooked dried food products.

In the embodiment of FIG. 2, untreated food 10 in storage bin 1 is introduced into chamber 5 having a fluidized bed where pressurized air from a source 6 at the bottom blows food 10 upward. The activated smoke liquid solution 3 is also introduced into chamber 5 from a sprayer 2. The spraying equipment 2 utilizes an inert gas 4 such as nitrogen, carbon dioxide, or the like. The spray quantity has between approximately 100 ppm and 3,000 ppm liquid smoke solution depending on the food product to be processed. During the upward movement, food 10 comes into contact with the smoke liquid solution 3 which coats the food particles, treating them.

Figure 4:
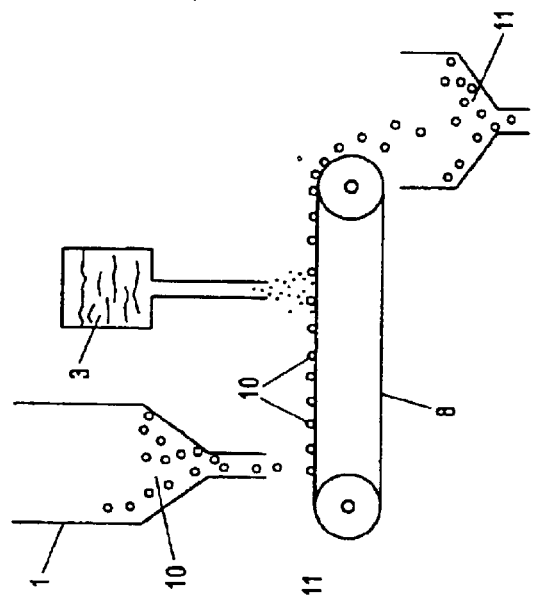
FIG. 4 is a diagrammatic side view of another embodiment of the present invention.
Figure 3:
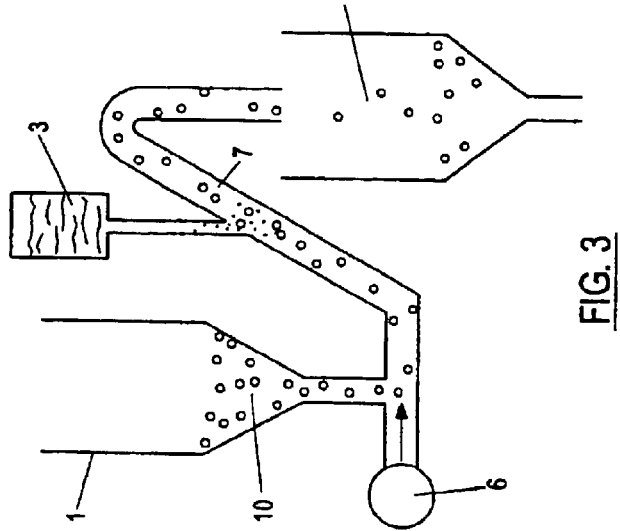
FIG. 3 is a diagrammatic side view of another embodiment of the present invention.

In the embodiment of FIG. 3, the activated smoke liquid solution 3 is sprayed onto food 10 during pneumatic transport 7 of food 10 from storage tank or bin 1 by pressurized air 6 from which it is transported for further processing. In the embodiment of FIG. 4, the activated smoke liquid solution 3 is sprayed over food 10 on a moving conveyor 8 from which it is deposited into a receptacle for further processing. The spray quantity in FIGS. 3 and 4 is between approximately 100 and 3,000 ppm liquid smoke solution depending on the food product to be processed. Finally, in the embodiment of FIG. 5, food 10 is immersed in a trace quantity of activated smoke liquid solution 3 of between about 100 ppm to 3,000 ppm, depending upon the food product immersed, liquid smoke solution and salt and/or seasoning solution in an immersion tank 9 either in separate batches or in a continuous stream. Treated food 11 is taken from tank 9 for further processing.

As an example, brown rice treated with the activated smoke liquid solution shows immediate, rapid, and quicker water absorption, higher volume and weight of water retention in cooked brown rice, retention of food texture after freeze-thawed, and better shelf life than brown rice in conventional treatment without smoke liquid solution. Table 1 is a comparison of the results of use of the sprayed on belt conveyer form of present invention on brown rice compared to conventional drying method of wind blustering at low temperature:

TABLE 1

(Brown Rice)

| | Present Invention | Conventional Drying |
|---|---|---|
| Soaking time prior to cooking | 0 hours | 5 hours |
| Water retention in cooked rice (rice = 1 volume) | 1.7 volume | 1.2 volume |
| Food texture after freeze-defrost: | Excellent grain kernel shape Excellent water holding | Poor crushed grain kernel shape Water dripping |
| Shelf life of cooked brown rice: | Excellent after 2 days No discoloration | Discoloration/odor after 2 days |

In accordance with the above descriptions, it is seen that spraying the said above products to be dried with a trace quantity of activated smoke liquid in activated smoke liquid spraying equipment can be applied as a pre-treatment prior to drying or post-treatment in a finishing process. Spraying the food products to be dried with a trace quantity of activated smoke liquid in activated smoke liquid spraying equipment can be applied during the fluidizing process or pneumatic transport, and immersing the said above products to be dried in activated smoke liquid solution can be applied in a tank as a pre-treatment of drying or further processing, providing the following advantages:

1. Immediate, rapid absorption of water and retention of water in food texture of rice, barley, wheat, other grains, soybean/legumes, dried vegetables, dried mushrooms, dried fruits, dried sea/aqua products per se and ones prepared with dried food products as ingredients.

2. Preservation of quality and extension of shelf life of rice, barley, wheat, other grains, soybean/legumes, dried vegetables, dried mushrooms, dried fruits, dried sea/aqua products per se and ones prepared with dried food products as ingredients.

3. Prevention of food texture deterioration after being freeze-thawed by the retention of water holding capability and the preservation of rice, barley wheat, other grains, soybean/legumes, dried vegetables, dried mushroom, dried fruits, dried sea/aqua products and ones prepared with dried food products as ingredients.

It is to be understood that variations and modifications of the present invention may be made without departing from the scope thereof. It is also to be understood that the present invention is not to be limited by the specific embodiments disclosed herein, but only in accordance with the appended claims when read in light of the foregoing specification.

What is claimed is:

1. A method for making a composition of smoke liquid solution to be applied to food that is to be dried comprising the steps of:

a. pyrolizing raw material woods or bamboo under deoxidized conditions to create a smoke fraction;

b. passing the smoke fraction through a water cooling heat exchanger;

c. preparing a crude smoke liquid concentrate by liquefying the smoke fraction through condensing and by activation treatment in an electrified field;

d. allowing the crude concentrate to stand for between about one and about six months until it separates into three distinct layers of oil, smoke liquid and tar;

e. removing the oil and tar layers from the concentrate;

f. distilling the remaining layer of the crude smoke liquid concentrate to form a distillate;

g. condensing the distillate to form a distilled fraction; and h. diluting the distilled fraction in deep sea water to a ratio of between about 100 ppm and about 3,000 ppm to form the composition smoke liquid solution.

2. The method of claim 1 wherein the smoke fraction is passed through a water cooling heat exchanger at a temperature between 80 and 350 degrees Celsius.

3. The method of claim 2 wherein the a crude smoke liquid concentrate is prepared by electrifying the smoke fraction with electrodes having a high voltage direct current (DC) of between about 50 and about 60 Hertz, at between about 1,000 volts and about 10,000 volts.

4. The method of claim 3 wherein the distilled concentrate is condensed at a temperature of between about 80 and about 160 degrees C.

5. The method of claim 4 wherein the distilled fraction is diluted in deep sea water taken from a depth of at least 300 meters.

6. The method of claim 4 wherein the distilled fraction is diluted in deep sea water taken from a depth where solar rays do not reach.

7. The method of claim 4 wherein the distilled fraction is diluted in deep sea water having the characteristics of a high mineral content, high hardness, slight alkalinity, clarity, cleanliness, and stable water molecule clusters.

8. A composition for application to food to be dried comprising an activated smoke liquid solution made according to the method of claim 1.

* * * * *